Oct. 21, 1958     H. N. STEPHAN     2,856,789
DRIVE MECHANISM FOR HORIZONTAL BORING, DRILLING
AND MILLING MACHINE
Filed May 5, 1955     3 Sheets-Sheet 2

INVENTOR.
HALLIS N. STEPHAN

Oct. 21, 1958  H. N. STEPHAN  2,856,789
DRIVE MECHANISM FOR HORIZONTAL BORING, DRILLING
AND MILLING MACHINE
Filed May 5, 1955  3 Sheets-Sheet 3
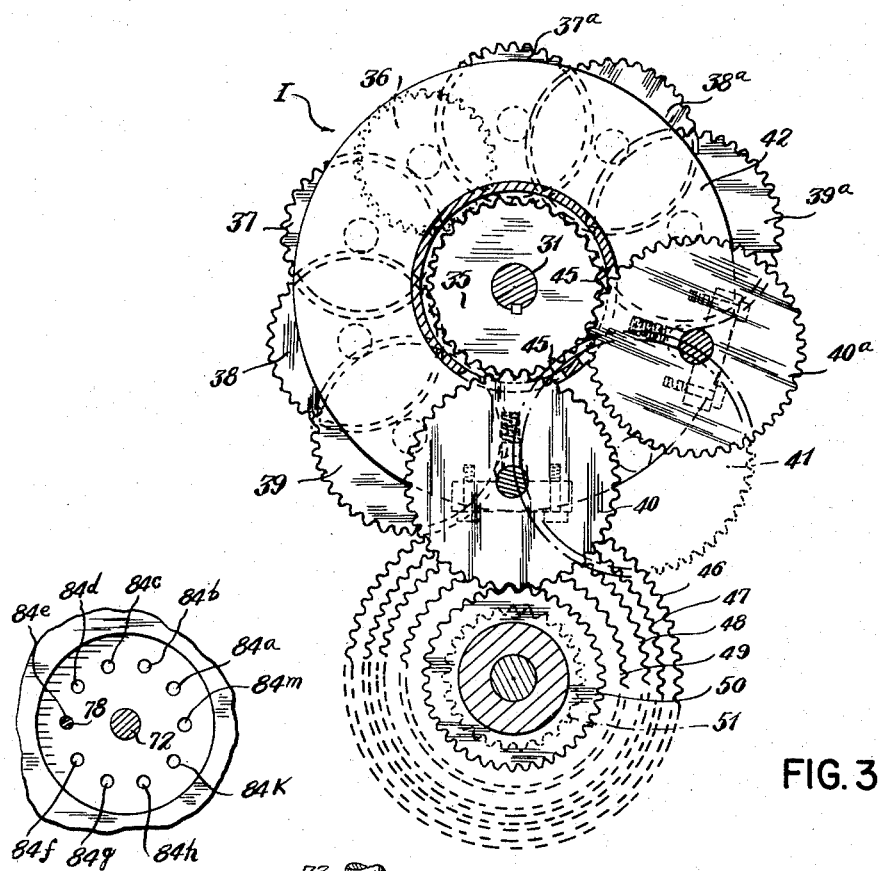
FIG. 3
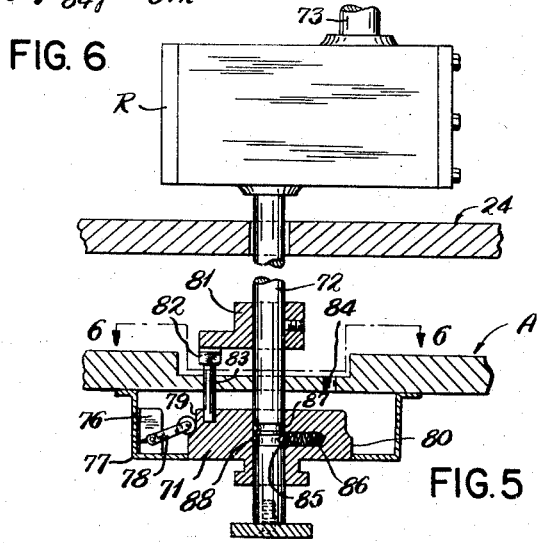
FIG. 6
FIG. 5
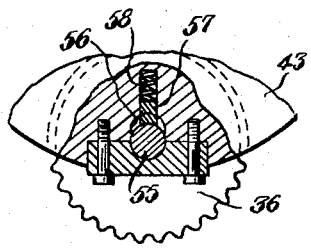
FIG. 4
INVENTOR.
HALLIS N. STEPHAN
ATTORNEYS

United States Patent Office 2,856,789
Patented Oct. 21, 1958

2,856,789

DRIVE MECHANISM FOR HORIZONTAL BORING, DRILLING, AND MILLING MACHINE

Hallis N. Stephan, Cleveland Heights, Ohio, assignor to The New Britain Machine Company, New Britain, Conn., a corporation of Connecticut Application May 5, 1955, Serial No. 506,204

16 Claims. (Cl. 74—472)

The present invention relates to machine tools and, more particularly, to machine tools, such as, combined horizontal boring, drilling and milling machines, utilizing variable speed gearing in the drive for at least one of the machine tool elements thereof.

The principal object of the present invention is the provision of a new and improved machine tool, such as a horizontal boring, drilling and milling machine, having a power actuated machine tool element, for example, a tool or work supporting spindle, a slide, or a work table, etc., selectively driven or moved at one of a plurality of speeds, and a relatively simple, trouble-free drive including compact, power shiftable, variable speed gearing for interconnecting the machine tool element with the power actuator therefor, the compact variable speed gearing being so constructed and arranged that it can be quickly and smoothly shifted without danger of jamming.

Another object of the present invention is the provision of a new and improved machine tool, particularly a combined horizontal boring, drilling and milling machine, having a movable machine tool element and power actuated means for moving the machine tool element, which power actuated means includes variable speed gearing comprising first and second gear means, a cage member having a plurality of idler gears in mesh with the first gear means and rotatable about the first gear means to selectively mesh the idler gears with respective gears of the second gear means to obtain different speed changes, in combination with a position control member movable to different positions for selecting different speeds and power actuated means to rotate the cage member to a position corresponding to the selected position of the control member.

Another object of the present invention is the provision of a new and improved power transmission for use in machine tools or the like, which transmission comprises first and second non-meshing gear means, and a cage member supporting a plurality of idler gears about one of the gear means and rotatable to selectively and sequentially move the idler gears to and through positions in mesh with both the first and second gear means to interconnect the same, the transmission being so constructed and arranged that the idler gears are rotated about their respective axes upon the rotation of the cage member.

The present invention resides in certain construction, combinations and arrangements of parts and further objects and advantages will be apparent to those skilled in the art to which it relates from the following description of the preferred embodiments described with reference to the accompanying drawings forming a part of this specification, in which:

Fig. 3 is a sectional view taken approximately along line 3—3 of Fig. 2;

Fig. 4 is a fragmentary sectional view showing the manner of supporting the idler gears shown in Figs. 2 and 3;

Fig. 5 is a fragmentary sectional view of a portion of the bed showing part of the control for the variable speed transmission shown in Figs. 2 and 3;

Fig. 6 is a view taken approximately along line 6—6 of Fig. 5; and

Fig. 7 is a simplified circuit diagram for a machine embodying the present invention.

Figure 1:
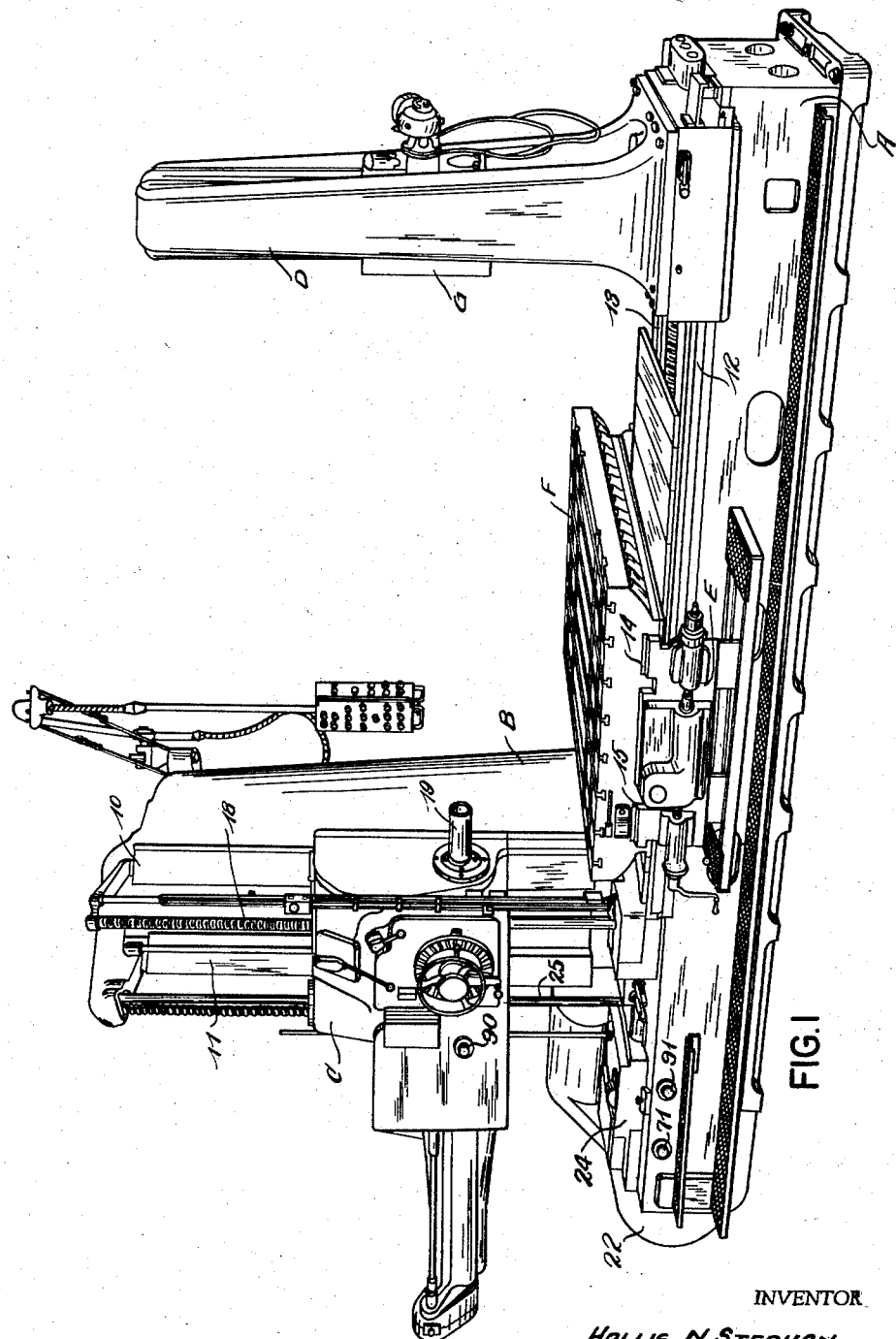
Fig. 1 is a perspective view of a combined horizontal boring, drilling and milling machine embodying the present invention.

The present invention is susceptible of various modifications and constructions and is herein shown as embodied in a combined horizontal boring, drilling and milling machine similar to that shown and described in U. S. Patent No. 2,350,174 to Lucas et al., with the exception of the speed change transmission for the tool spindle and the feed change transmissions for the spindle, and the spindle head, saddle and table, and the controls therefor.

Referring to the drawings, the machine shown comprises a base or bed A provided at one end with a spindle head column B having vertical ways 10 and 11 on the front face thereof, upon which ways a spindle head C is mounted for vertical movement. At the other end of the bed A, a backrest or outboard support column D is slidably supported on horizontal ways 12 and 13 formed on the upper side of the bed. The ways 12 and 13 also slidably support a saddle E, the upper side of which is provided with horizontal ways 14 and 15, which, in turn, support a work table F. A backrest block G is slidably supported for movement along vertical ways formed on the backrest column D.

The spindle head C, which is preferably counterbalanced by a weight (not shown), is adapted to be fed or otherwise moved vertically along the ways 10 and 11 by a lead screw 18 rotatably supported in the bed A and the spindle head column B, and having threaded engagement with a nut fixed in the spindle head. The spindle, designated generally by the reference character 19, is adapted to be moved in opposite directions longitudinally of its axis to effect both feed and rapid traverse movements and is rotated or driven in either direction from a reversible driving motor 23 enclosed within a guard 22 adjacent to the left-hand end of the machine through the medium of a speed change transmission, designated generally by the reference character I, and housed within a suitable gear box 24 supported in the bed of the machine; a vertical shaft 25 having its lower end rotatably supported in the gear box 24 and its upper end supported in a cap affixed to the top of the spindle head of column B; and back gears etc. (not shown) located within the spindle head C and operatively connecting the vertical shaft 25 to the spindle 19.

In the preferred embodiment of the invention shown the speed change gearing I comprises an input shaft 31 driven from the motor 23 by a V-belt drive 32. The shaft 31 is rotatably supported in the gear box 24 by the left hand wall 33 of the gear box and an internal web 34 and has mounted thereon a plurality of like driving gear 35, continuously in mesh with a plurality of idler gears 36, 37, 37a, 38, 38a, 39, 39a, 40, 40a, and 41 supported in spaced angular relationship about the shaft 31 by a cage member 42. The idler gears, in the illustrated embodiment, mesh with different driving gears 35 with the exception of idler gears 37a, 38a, 39a and 40a which mesh, respectively, with the same driving gears as idler gears 37, 38, 39 and 40. The idler gears which mesh with the same driving gears are alike. The idler gears which mesh with different driving gears 35, however, increase in size from left to right as viewed in Fig. 2.

The cage member 42 comprises a hub portion 43 surrounding the driving gears 35 and supported on the shaft 31 for relative rotation with respect thereto by suitable anti-friction bearings. The cage member 42 includes a plurality of radially extending spaced transverse walls or webs 44 formed integral with the hub portion 43 and which walls support shafts upon which the idler gears are mounted, the idler gears being supported between different adjacent walls 44 with the exception of gears 37a, 38a, 39a, and 40a, which are supported between the same walls 44 as the gears 37, 38, 39, and 40, respectively. The hub 43 has a plurality of openings 45 therein, one adjacent each idler gear, to permit the idler gears to mesh with their respective driving gears 35. The idler gears 36, 37 and 37a, 38 and 38a, 39 and 39a, 40 and 40a, and 41, of the speed change gearing I are adapted to be selectively and separately meshed with gears 46, 47, 48, 49, 50 and 51, respectively, keyed or otherwise fixed on an output shaft 52 rotatably supported in the gear box 24 by the wall 33 and web 34, the shaft 52 having a bevel gear 53 fixed to the right-hand end thereof, as viewed in Fig. 2. The gear 53 is in mesh with a bevel gear 54 fixed to the lower end of the vertical shaft 25. The driven gears 46–51 are of different diameters decreasing in size from left to right as viewed in Fig. 2, and are mounted on the shaft 52 in the manner of step or cone gears.

Each idler gear is adapted to be meshed with a respective driven gear to provide a particular spindle speed, assuming the speed of the motor 23 to be constant. The idler gears are supported in spaced angular relationship about the driving gears 35 by the cage member 42 so that only one of the idler gears will be in driving mesh at any given time with the driven gears, but so that they will sequentially mesh with their respective or corresponding driven gear as the cage member 42 is rotated with respect to the shaft 31, thereby imparting different speeds to the driven shaft 52 and in turn the tool spindle 19.

In the illustrated embodiment, the arrangement of the idler gears in such that when shifting from one speed to another the cage member can always be rotated in the same direction to change the speeds and to cause the transmission to shift progressively through its respective speeds until the desired speed is reached regardless of whether shifting to higher or lower speeds. To this end the idler gear 36, the smallest of the idler gears, and the idler gear 41, the largest of the idler gears, are preferably spaced 180 degrees from each other about the axis of shaft 31. The idler gears 37, 38, 39 and 40 are supported by the cage member 42 on one side of a plane through the centers of the idler gears 36 and 41 and the axis of the shaft 31 with the angular spacing of the idler gears from each other being such that they will progressively and sequentially mesh with their corresponding driven gear in the order of the sizes of the idler gears as the cage member 42 is rotated in a given direction.

The idler gears 37a, 38a, 39a, and 40a are mounted in the cage member 42 on the opposite side of the plane through the axis of the gears 36, 41 and the shaft 31 from the idler gears 37, 38, 39 and 40, and are spaced angularly from each other so that as the cage member is rotated, the gears will progressively mesh with their corresponding driven gears in the order of their sizes. The construction is such that by rotating the cage member 42 clockwise as viewed in Fig. 3, through a complete revolution from a position where the gear 36 is in mesh with its corresponding driven gear 46, the gears will mesh in the following sequence: gears 37 and 47; gears 38 and 48; gears 39 and 49; gears 40 and 50; gears 41 and 51; gears 40a and 50; gears 39a and 49; gears 38a and 48; gears 37a and 47; and gears 36 and 44; and the transmission will progressively shift from the lowest speed to the highest speed in the order of increasing speeds and from the highest speed to the lowest speed in the order of decreasing speeds.

The described embodiment of the present invention employs two idler gears for each speed of the transmission intermediate the highest and lowest speeds thereof to provide a transmission which can be shifted progressively through all the intermediate speeds when shifting from either the lowest speed of the transmission to the highest speed or from the highest speed to the lowest speed. Such a construction is particularly advantageous if the transmission is to be shifted under load, i. e. without stopping or disconnecting either the motor 23 or the tool spindle.

In applications where a jump of intermediate speeds during shifting is not objectionable, the idler gears 37a, 38a, 39a, 40a for the intermediate speeds can be omitted and the gears 36, 37, 38, 39, 40 spaced 360 degrees around the shaft 31. Constructed in this manner, the transmission will progressively shift from the lowest speed to the highest speed and then jump from the highest speed to the lowest speed or vice versa, as the cage member is continuously rotated in one direction. It will be understood, however, that a single idler gear for each speed intermediate the highest and lowest speeds of the transmission can be provided and the transmission caused to shift through all speeds without jumping from the highest speed to the lowest speed or vice versa, by causing the cage member to rotate from its position where the transmission operates at the lowest speed in the proper direction to sequentially mesh the idler gears and cause the transmission to progressively shift through the intermediate speeds to the highest speed and then to reverse its direction of rotation when it reaches the highest speed position and thereafter to reverse its direction each time it reaches its lowest speed position or its highest speed position.

It will be understood by those skilled in the art that the greater the number of idler gears spaced about the shaft 31 and sequentially brought into mesh with the gears on the output shaft 52 for a single rotation of the cage member, the greater will be the smoothness of the shifting of the transmission between the various speeds. It is also desirable that whenever possible the idler gears be spaced so that any given idler gear is coming into mesh with its respective driven gear just as the immediately preceding idler gear is leaving meshing engagement with its respective driven gear, for reasons which will appear hereinafter.

The meshing of the idler gears with their corresponding driven gears may be facilitated by supporting the idler gears in a floating manner. The idler gears of the illustrated transmission are so supported. The support for the idler gear 36 is shown in detail in Fig. 4. The other idler gears are supported in a similar manner. The the idler gear 36 is mounted on a shaft 55 for rotation with respect thereto, the shaft 55 being supported between spaced webs 44 of the cage member 42, with opposite end of the shaft received in radially elongated slots 56 in the webs. The shaft 55 and, in turn, the gear 36, are biased radially outwardly of the cage member 42 by spring pressed plungers 57 located in radial bores 58 opening into the bottoms of the slots 56 and engaging opposite ends of the shaft.

When the gear 36 is rotated to a position where it is to mesh with its corresponding driven gear, the floating type support facilitates the meshing of the gears and helps to prevent jamming thereof. The danger of jamming of the gears may also be minimized by rounding the teeth of the idler gears and their corresponding driven gears.

When the gear 36 is in its outward position with respect to the elongated slots 57, it is not in the position to properly mesh with its corresponding driving and driven gears.

As the gears come in mesh, however, the spring-biased plungers 57 allow radially inward movement of the gear 36 to permit proper meshing of the gear with both its drive gear 35 and its corresponding driven gear.

Unless the cage member 42 is held against rotation with respect to the shaft 31, operation of the motor 23 will cause the cage member 42 to rotate on the shaft 31 to sequentially mesh the idling gears without causing a transmission of power to the output shaft 52, this is especially so if the idler gears are placed in the cage member so that as each idler gear is leaving meshing engagement with its output gear, the following one is beginning to mesh with its output gear. Because of the tendency of the cage member to rotate about the shaft 31 when the latter is driven, it is possible to shift from one speed to another by merely driving the shaft 31 and allowing the cage member to rotate. Preferably, however, the cage member 42 is driven during the shifting operation, in the direction it tends to rotate upon rotation of the shaft 31, by suitable means such as that hereinafter described. The cage member can be driven in the direction opposite to that in which it tends to rotate when the shaft 31 is driven, if desired, but this would require the application of additional power and the meshing of the gears could not be as easily accomplished.

Figure 2:
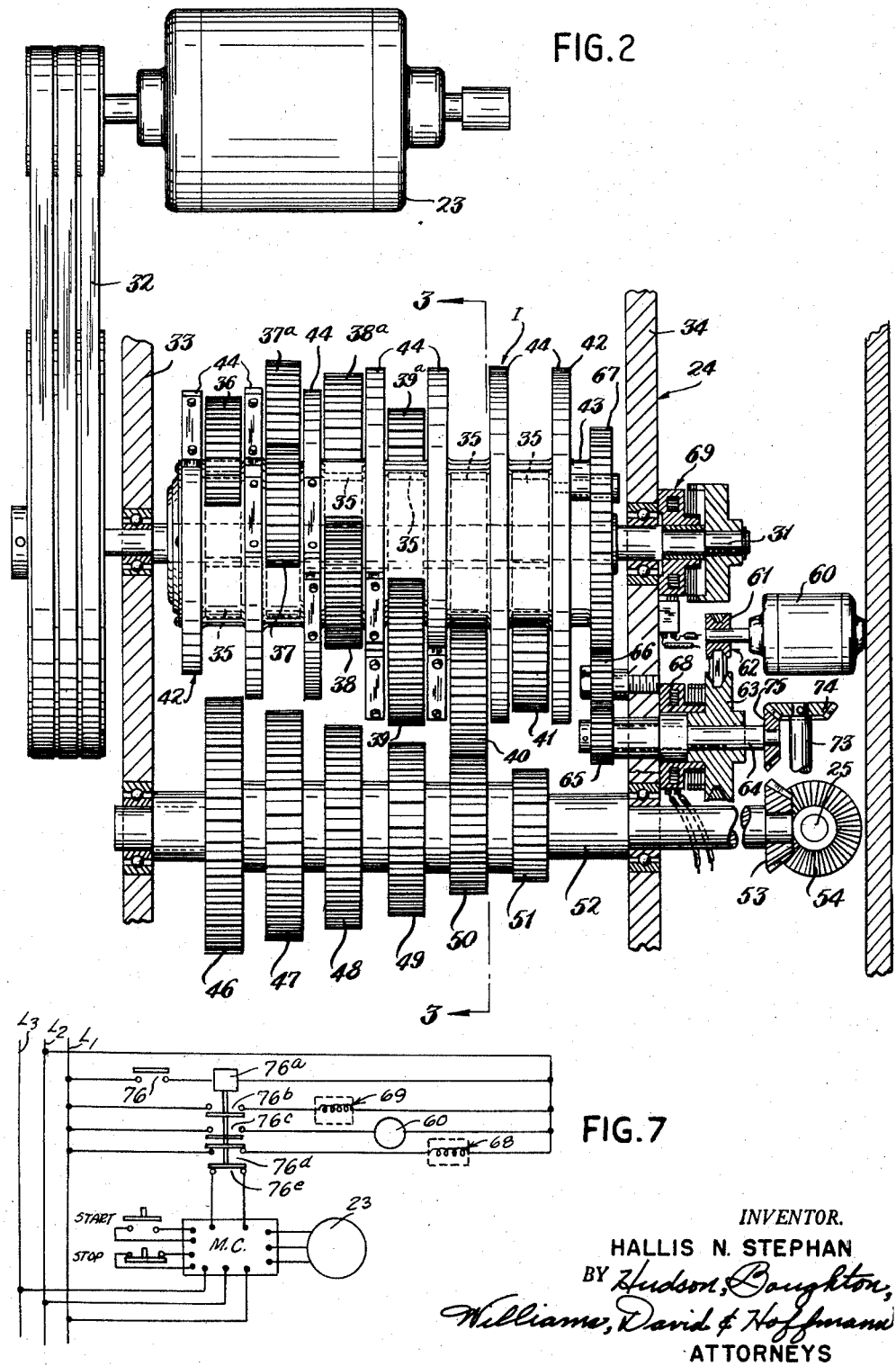
Fig. 2 is a developed plan view of that portion of the spindle drive of the machine shown in Fig. 1, which is located in the base of the machine.

In the illustrated embodiment, the cage member 42 is rotated to effect the shifting of the transmission by an electric motor 60 having mounted on its armature shaft a driving pulley 61 connected by a belt 62 to a driven pulley 63 keyed to the right hand end of a shaft 64, see Fig. 2, rotatably supported in the gear box 24, which shaft has a gear 65 on its left hand end in mesh with an idler gear 66, which, in turn, is in mesh with a gear 67 formed on the cage member 42. A magnetic brake 68 is supported by the gear box 24 about the shaft 64 and is adapted to selectively prevent rotation of the shaft 64.

When the gears of the speed change gearing I are to be shifted, the motor 60 is energized to rotate the driving pulley 61 and the brake 68 is deenergized to permit rotation of the driven pulley 63 and the shaft 64. Rotation of the driven pulley 63 causes rotation of the cage member 42 through gears 65, 66, and 67 to aid or effect the shifting of the idler gears into and out of engagement with their corresponding output gears. The motor 23 preferably is stopped during the shifting of the transmission for reasons hereinafter referred to. When the selected idler gear is in mesh with its corresponding driven gear, the motor 60 is deenergized to stop the drive to the cage member 42 and the brake 68 is energized to prevent further rotation of the shaft 64. The cage member 42 is thus locked in the selected angular position and the transmission conditioned to transmit power to the output shaft 52 upon rotation of the input shaft 31.

The transmission may be shifted, if desired, without stopping or disconnecting the driving motor 23 from the input shaft and without disconnecting the load from the output shaft 52. Preferably, however, the motor 23 is stopped, as mentioned above, or disconnected from the shaft 31 and the gears 35, which gears are keyed to the shaft 31 and continuously in mesh with the idler gears carried by the cage held stationary while the transmission is being shifted. When the gears 35 are stationary and the cage member 42 rotated to shift the transmission, the idler gears in the cage will rotate about their respective axes and will more readily mesh with their respective gears on the shaft 52 as they are moved into meshing position, thereby facilitating the shifting of the transmission without jamming the gears. In the illustrated embodiment the motor 23 is stopped and an electro-magnetically operated brake 69, having one element fixed to the wall 54 of the gear box 24 and one element keyed to the shaft 31, energized or applied to prevent rotation of the shaft 31 and in turn the gears 35. It is understood that in place of stopping the motor 23 a clutch or similar mechanism can be provided intermediate the motor 23 and the shaft 31 for disconnecting the motor from the shaft.

The rotation of the cage member 32 to shift the gears is, in the illustrated embodiment, under the control of a control member 71 located adjacent to the front side of the bed A as viewed in Fig. 1 and adapted to be manipulated by the operator of the machine. The control member 71 is rotatably and slidably supported on a horizontal shaft 72 extending outwardly from the front wall of the gear box 24 through the front wall of the bed A, which shaft 72 is connected to a shaft 73 in the gear box 24 through reduction gearing R. The shaft 73 has a bevel gear 74 on the inner end thereof in mesh with a bevel gear 75 on the right hand end of the shaft 64, as the latter is viewed in Fig. 2. Rotation of the shaft 64 to shift the gears of the transmission I causes the shaft 72 to rotate through one revolution for each revolution of the cage member 42.

Actuation of the drive motor 23 and the brake 69 is under the control of an electric switch 76 as is the actuation of the motor 60 and the brake 68. The switch 76 is connected to the inside of a sheet metal guard 77 for the control member 71 and is provided with contacts which preferably control the energization of an operating relay 76a shown in the simplified circuit diagram of Fig. 7 of the drawings and having contacts connected into the circuits of the electro-magnetically operated brakes 68, 69 and the motors 23, 60 for controlling the operation of the brakes and motors in accordance with the position of the control member 71.

The circuits controlled by the switch 76 are such that when the control member 71 is in its normal or outer position on shaft 72, that is, the position shown in Fig. 5, the actuating arm 78 of the switch 76 rides upon the periphery 79 of the control member 71, the motor 23 is energized to rotate shaft 31, the brake 69 is deenergized to allow the shaft 31 to rotate, the brake 68 is energized to prevent rotation of cage member 42, and the motor 60 is deenergized. When the control member 71 is in its inner position with respct to the shaft 72, that is, with the actuating arm 78 of the switch 76 riding on an annular flange 80 of the control member 71, the circuits controlled by the switch 76 through the relay causes the deenergization of the motor 23, the release of brake 68 to allow rotation of the cage 42, the energization of the brake 69 to prevent rotation of the shaft 31, and the energization of motor 60 to rotate the belt drive for the cage member 42, thereby preventing rotation of the gears 35 and rotating the cage 42 until such a time that the control member 71 is moved to its outer position.

The circuit diagram of Fig. 7 is a simplified diagram and shows the relationship of the contacts of relay 76a, which is controlled by the switch 76, to the control circuit for the machine and it will be apparent therefrom that the relay 76a has normally open contacts 76b which when closed energize the brake 69, normally open contacts 76c which when closed energize the motor 60 for rotating the cage, normally closed contacts 76d which when open breaks the energizing circuit for the brake 68 to release the cage 42 for rotation, and normally closed contacts 76e in the motor control circuit MC for controlling the connection of the motor 23 to the three-phase power supply and which when opened stop the operation of motor 23. When the actuating arm 78 is riding on the flange 80, the contacts of switch 76 are closed to energize the relay 76a to open its normally closed contacts and close its normally open contacts to energize the brake 69 and motor 60 and to de-energize the motor 23 and brake 68. When the switch 76 is opened the brake 69 and motor 60 are de-energized and the motor 23 and brake 68 are re-energized.

The control member 71, as shown, is moved from its inner to its outer position by a member 81 fixed to the shaft 72 intermediate the gear box 24 and the front wall of the bed A. The member 81 is provided with a cam 82 having an inclined surface adapted to engage a pin 83 extending inwardly from the inner side of the control member 71 through one of a plurality of spaced holes 84 in the front wall of the bed arranged in a circle about the shaft 72. Engagement of the cam 82 with the pin 83 causes the latter to move the control member 71 axially from its inner position to its outer position on the shaft 72.

The control member 71 is yieldably retained in its inner or outer position by a spring-pressed ball detent 85 positioned in a radial bore 86 and adapted to engage groove 87 in the shaft 72 when the control member 71 is in its outer position, that is, the position shown in Fig. 5, and a second annular groove 88 in the shaft 72 when the control member is moved inwardly a predetermined distance on the shaft 72 from the position of Fig. 5. The groove 87 is deeper than the groove 88 and when the machine is in operation the control member 71 is normally positioned on the shaft 72 in its outer position with the ball detent 85 in groove 87 and is adapted to be moved to this position from its inner position on the shaft 72 with the ball detent 85 in groove 88 by the cam 82 on the member 81.

In the illustrated embodiment there is a hole 84 for each position of the cage member 42 corresponding to a different transmission speed. The spaced holes 84 are best shown in Fig. 6 with the hole corresponding to the angular position of the cage member 42 where the idler gear 36 is in mesh with its driven gear 46 being designated by the reference numeral 84a. The member 81 is positioned so that the high point of the cam 82 is directly behind the hole 84a when the gear 36 is in mesh with the gear 46 and the other holes 84 are so spaced from the hole 84a that as the cage member 42 is rotated to sequentially move the idler gears, the high point of the cam 82 is moved to and through positions behind the holes 84 corresponding to the various respective angular positions of the cage member 42. In Fig. 6 the holes 84 other than the hole 84a have been designated as 84b, 84c, 84d, 84e, 84f, 84g, 84h, 84k and 84m to indicate the respective holes corresponding to the angular position of the cage member 42 where the gears 37, 38, 39, 40, 41, 40a, 39a, 38a, and 37a, respectively, are in mesh with their corresponding driven gears.

When a different speed from that for which the control member is set is to be selected, the control member 71 is moved outwardly along the shaft 72 away from the cam 82 until the pin 83 clears the adjacent front wall of the bed A. This does not affect the position of the switch 76. The control member 71 is then rotated and the pin 83 placed in the hole 84 corresponding to the desired speed after which the control member is moved inwardly on the shaft 72 until the ball detent 85 engages groove 87. With the control member in this position, the transmission will operate or will continue to operate at the previously selected speed. When the operator desires to change the speed of the spindle to the newly selected speed, he further depresses the control member 71 until the ball detent 85 engages in the groove 88 and the switch arm 78 engages flange 80 of the control member, whereupon the circuits to the brakes 68, 69 and motors 23, 69 will be such that the motor 23 will be deenergized and the shaft 31 held against rotation and the cage member 42 rotated. When the cage member 42 is rotated to its angular position corresponding to the hole in which pin 83 is positioned, the cam 82 engages the pin 83 and moves the control member 71 to its outer position on the shaft 72 wherein the ball detent 85 is in groove 87 and the switch arm 78 in engagement with the periphery 79 of the control member thereby causing the deenergization of motor 60, the energization of the brake 68 to prevent further rotation of the cage member 42, the deenergization of the brake 69 to permit rotation of shaft 31, and the energization of the motor 23. The above described mechanism for positioning the cage member 42 in accordance with the position of control member 71, in effect, constitutes servo-control means for the cage member and provides a ready means for selecting the speed of transmission from a position remote from the transmission.

The variable speed gearing I is, as previously stated, located in and forms part of the drive for the tool spindle 19 and in the combined horizontal boring, drilling and milling machine shown, similar variable speed transmissions having control members 90, 91 are preferably employed in the drive for effecting the feeding of the spindle 19 and in the drive for effecting the feeding of the spindle head C, saddle E and table F. The control members 90, 91 which control respectively the spindle feed transmission and the transmission in the feed for the spindle head, saddle and table and are similar in construction and operation to the control member 71.

In the embodiment shown and described, the idler gears are positioned about the input drive shaft of the transmission and the driven output gears are of different sizes, it will be understood by those skilled in the art that either the size of the driving input gears or the size of the driven output gears or both may be varied to obtain the particular gear ratios and that the idler gears could be supported for rotation about the output gears if so desired.

From the foregoing description, it will be apparent that the objects heretofore enumerated, as well as others, have been accomplished and that a new and improved machine tool has been provided having a drive including variable speed gearing for moving a movable machine tool element thereof. The variable speed gearing is so constructed and arranged that it is readily shiftable without danger of jamming and includes first gear means mounted on a first shaft, second gear means mounted on a second shaft, and a cage member supporting a plurality of idler gears for rotation about one of said shafts to sequentially mesh the idler gears supported thereby with both the gear means on said first and second shafts when positioned directly therebetween, there being an idler gear provided for each speed of the transmission. While the transmission may be so constructed and arranged that the power to the input shaft may be used to effect shifting of the gearing, power actuated means controlled by servo-control means is preferably provided for positioning the cage member in accordance with the positioning of a control member located exteriorly of the machine in a position readily accessible to the operator.

While the preferred embodiment has been described with considerable detail, the invention is not limited to the particular constructions shown, and it is my intention to cover hereby all adaptations, modifications and uses thereof which come within the practice of those skilled in the art to which the invention relates and the scope of the appended claims.

Having thus described my invention, I claim:

1. In a speed change transmission for a machine tool or the like and having a high speed, a low speed, and at least one intermediate speed, first and second spaced shafts, first and second gear means on said first and second shafts respectively defining a plurality of pairs of gears having different gear ratios for providing different speeds, the individual gears of said pairs being spaced and on different shafts, a plurality of idler gears movable to a position directly intermediate said first and second gear means for selectively interconnecting with each other in driving relationship the individual gears of said pairs of gears, said idler gears including a first idler gear for each speed of the transmission and a second idler gear for each speed intermediate the highest and lowest speed of the transmission, a member supporting said idler gears in spaced angular relationship about said first shaft, said first idler gears being positioned in spaced angular relationship from each other about said first shaft progressively in increasing order of the speeds provided thereby when proceeding about said first shaft in one direction from the idler gear for the low speed of the transmission and said second idler gears being positioned in spaced angular relationship about said first shaft from said first idler gears progressively in the order of decreasing speeds from said first idler gear providing the high speed of the transmission when proceeding about said first shaft in said one direction.

2. In a speed change transmission having a low speed, a high speed, and at least one intermediate speed, first and second spaced shafts, first gear means on one of said shafts, second gear means comprising a plurality of different size gears on the other of said shafts including a gear for each of the speeds of the transmission, a plurality of first idler gears including one for each of the speeds of the transmission, said idler gears being adapted to mesh with both said first gear means and different gears of said second shaft, each idler gear providing a particular speed when positioned between said first and second gear means, a member supporting said idler gears in spaced angular relationship on one side of said first shaft progressively in increasing order of the speeds provided thereby when proceeding in one direction about the shaft and rotatable to sequentially move said first idler gears to and through meshing engagement with their corresponding gears on said second shaft, and a second idler gear for each of the intermediate speeds of the transmission adapted to mesh with said first gear means and the gear on said second shaft corresponding to the particular speed when positioned directly between the latter and the first gear means, said member supporting each of said second idler gears in spaced angular relationship on the other side of said first shaft in increasing order of the speeds provided thereby when proceeding about the shaft in a direction opposite to said first direction, the spacing between said idler gears being such that as one idler gear is leaving meshing engagement with both said first and second gear means the following idler gear is starting to mesh with both said first and second gear means.

3. In a machine tool having a movable element and power actuated means for moving the element comprising a multiple speed transmission having a high speed, a low speed, and at least one intermediate speed, first and second spaced shafts, first and second gear means spaced from each other and on said first and second shafts respectively, a plurality of idler gears including an idler gear corresponding to each speed of the transmission, each of said idler gears being adapted to mesh with both said first and second gear means when positioned directly therebetween to interconnect said first and second shafts and provide a particular gear ratio to obtain a particular speed, a member supporting said idler gears about one of said shaft in spaced angular relationship and rotatable in a given direction to sequentially move said idler gears into and through said meshing position, and means for effecting a drive to said member to selectively rotate the member and to hold the member against rotation upon the discontinuance of the rotation of the member including power means operable to selectively rotate the member and means effective to hold the member against rotation upon discontinuance of the rotation of the member by said power means.

4. In a machine tool having a movable element and power actuated means for moving the element comprising a multiple speed transmission having a high speed, a low speed, and at least one intermediate speed, first and second spaced shafts, first and second gear means spaced from each other and on said first and second shafts respectively, a plurality of idler gears including an idler gear corresponding to each speed of the transmission, each of said idler gears being adapted to mesh with both said first and second gear means when positioned directly therebetween to interconnect said first and second shafts and provide a particular gear ratio to obtain a particular speed, a member supporting said idler gears about one of said shafts in spaced angular relationship and rotatable in a given direction to sequentially move said idler gears into and through said meshing position, power actuated means operatively connected to said member for selectively holding said member against rotation and for selectively rotating said member, and means for selectively preventing rotation of the shaft about which said idler gears are supported upon rotation of said member.

5. In a speed change transmission for a machine tool or the like having a high speed, a low speed, and at least one intermediate speed, first and second spaced shafts, first and second gear means on said first and second shafts respectively defining a plurality of pairs of gears having different gear ratios for providing different speeds, the individual gears of said pairs being spaced and on different shafts, a plurality of idler gears movable to a position directly intermediate said first and second gear means for selectively interconnecting with each other in driving relationship the individual gears of said pairs of gears, said idler gears including a first idler gear for each speed of the transmission and a second idler gear for each speed intermediate the highest and lowest speed of the transmission, a member supporting said idler gears in spaced angular relationship about said first shaft, said first idler gears being positioned in spaced angular relationship from each other about said first shaft progressively in increasing order of the speeds provided thereby when proceeding about said first shaft in one direction from the idler gear for the low speed of the transmission and said second idler gears being positioned in spaced angular relationship about said first shaft from the first idler gear providing the high speed of the transmission progressively in decreasing order of speeds provided by the second idler gears when proceeding about said first shaft in said one direction, means operatively connected to said member for holding said member against rotation, and power operated means connected to the last said means for rotating the latter to selectively rotate said member.

6. In a machine tool having a movable element and power actuated means for moving the element comprising, a multiple speed transmission having a high speed, a low speed, and at least one intermediate speed, first and second spaced shafts, first and second gear means spaced from each other and on said first and second shafts respectively, a plurality of idler gears including at least one idler gear for each speed of the transmission, each of said idler gears being adapted to mesh with both said first and second gear means when positioned directly therebetween to interconnect said first and second shafts and provide a particular gear ratio to obtain a particular speed, a member supporting said idler gears about one of said shafts in spaced angular relationship and rotatable in a given direction to sequentially move said idler gears into and through said meshing position, a control member movable to a plurality of different positions each corresponding to a particular speed, and power actuated servo-control means for positioning the first-said member in accordance with said control member.

7. In a speed change transmission for a machine tool or the like having a high speed, a low speed, and at least one intermediate speed, first and second spaced shafts, first and second gear means on said first and second shafts respectively defining a plurality of pairs of gears having different gear ratios for providing different speeds, the individual gears of said pairs being spaced and on different shafts, a plurality of idler gears movable to a position directly intermediate said first and second gear means for selectively interconnecting with each other in driving relationship the individual gears of said pairs of gears, said idler gears including a first idler gear for each speed of the transmission and a second idler gear for each speed intermediate the highest and lowest speed of the transmission, a member supporting said idler gears in spaced angular relationship about said first shaft, said first idler gears being positioned in spaced angular relationship from each other about said first shaft progressively in increasing order of the speeds provided thereby when proceeding about said first shaft in one direction from the idler gear for the low speed of the transmission and said second idler gears being positioned in spaced angular relationship about said first shaft from the first idler gear providing the high speed of the transmission progressively in decreasing order of speeds provided by the second idler gears when proceeding about said first shaft in said one direction, a control member movable to a plurality of different positions each corresponding to a particular speed, and servo-control means for positioning the first-said member in accordance with the position of said control member.

8. In a speed change transmission having a low speed, a high speed, and at least one intermediate speed, first and second spaced shafts, first gear means on one of said shafts, a plurality of different size gears on the other of said shafts including one for each of the speeds of the transmission, a plurality of first idler gears including one for each of the speeds of the transmission, each of said idler gears being adapted to mesh with both said first gear means and the corresponding gear on said second shaft for the particular speed when positioned therebetween, a member supporting said idler gears in spaced angular relationship on one side of said first shaft progressively in increasing order of the speeds provided thereby when proceeding in one direction about the shaft and rotatable to sequentially move said first idler gears to and through meshing engagement with their corresponding gears on said second shaft, and a second idler gear for each of the intermediate speeds of the transmission adapted to mesh with said first gear means and the gear on said second shaft corresponding to the particular speed when positioned directly between the latter and the first gear means, said member supporting each of said second idler gears in spaced angular relationship on the other side of said first shaft progressively in increasing order of the speeds provided thereby when proceeding about the shaft in a direction opposite to said first direction, a control member movable to a plurality of different positions, each corresponding to a particular speed, and servo-control means for positioning the first-said member in accordance with said control member.

9. In a machine tool having a movable element and power actuated means for moving the element comprising, a multiple speed transmission having a high speed, a low speed, and at least one intermediate speed, first and second spaced shafts, first and second gear means spaced from each other and on said first and second shafts respectively, a plurality of idler gears including an idler gear corresponding to each speed of the transmission, each of said idler gears being adapted to mesh with both said first and second gear means when positioned directly therebetween to interconnect said first and second shafts and provide a particular gear ratio to obtain a particular speed, a member supporting said idler gears about one of said shafts in spaced angular relationship and rotatable in a given direction to sequentially move the idler gears into and through said meshing position, power actuated drive means selectively engageable to rotate said member, and disengageable from the latter, and brake means for preventing rotation of said member upon disengagement of the power actuated drive means.

10. In a machine tool having a movable element and power actuated means for moving the element comprising, a multiple speed transmission having a high speed, a low speed, and at least one intermediate speed, first and second spaced shafts, first and second gear means spaced from each other and on said first and second shafts respectively, a plurality of idler gears including an idler gear corresponding to each speed of the transmission, each of said idler gears being adapted to mesh with both said first and second gear means when positioned directly therebetween to interconnect said first and second shafts and provide a particular gear ratio to obtain a particular speed, a member supporting said idler gears about one of said shafts in spaced angular relationship and rotatable in a given direction to sequentially move said idler gears into and through meshing position, and power actuated drive means for selectively rotating said member, first brake means for selectively preventing rotation of said member, and second brake means for preventing rotation of the shaft about which said idler gears are supported upon rotation of said member.

11. In a machine tool having a movable element and power actuated means for moving the element comprising, a multiple speed transmission having a high speed, a low speed, and at least one intermediate speed, first and second spaced shafts, first and second gear means spaced from each other and on said first and second shafts respectively, a plurality of idler gears including an idler gear corresponding to each speed of the transmission, each of said idler gears being adapted to mesh with both said first and second gear means when positioned directly therebetween to interconnect said first and second shafts and provide a particular gear ratio to obtain a particular speed, a member supporting said idler gears about one of said shafts in spaced angular relationship and rotatable in a given direction to sequentially move said idler gears into and through meshing position, and power actuated drive means for selectively rotating said member, first brake means for selectively preventing rotation of said member, second brake means for preventing rotation of the shaft about which said idler gears are supported upon rotation of said member, and control means operable to simultaneously engage said second brake means, disengage said first brake means, and operate power actuated means to shift the transmission.

12. In a speed change transmission for a machine tool or the like and having a high speed, a low speed, and at least one intermediate speed, first and second spaced shafts, first and second gear means on said first and second shafts respectively defining a plurality of pairs of gears having different gear ratios for providing different speeds, the individual gears of said pairs being spaced and on different shafts, a plurality of idler gears movable to positions directly intermediate said first and second gear means for selectively interconnecting with each other in driving relationship the individual gears of said pairs of gears, said idler gears including a first idler gear for each speed of the transmission and a second idler gear for each speed intermediate the highest and lowest speed of the transmission, a member supporting said idler gears in spaced angular relationship about said first shaft, said first idler gears being positioned in spaced angular relationship from each other about said first shaft progressively in increasing order of the speeds provided thereby when proceeding about said first shaft in one direction from the idler gear for the low speed of the transmission and said second idler gears being positioned in spaced angular relationship about said first shaft from the first idler gear providing the high speed of the transmission progressively in decreasing order of speeds provided by the second idler gears when proceeding about said first shaft in said one direction, power actuated drive means selectively operable to rotate said member, and brake means for preventing rotation of said member when said power actuated drive means is not operating to rotate the member.

13. In a machine tool having a movable element and power actuated means for moving the element comprising, a multiple speed transmission having a high speed, a low speed, and at least one intermediate speed, first and second spaced shafts, first and second gear means spaced from each other and on said first and second shafts respectively, a plurality of idler gears including an idler gear corresponding to each speed of the transmission, each of said idler gears being adapted to mesh with both said first and second gear means when positioned directly therebetween to interconnect said first and second shafts and provide a particular gear ratio to obtain a particular speed, a member supporting said idler gears about one of said shafts in spaced angular relationship and rotatable in a given direction to sequentially move the said idler gears into and through said meshing position, power actuated means for driving said first shaft, a belt drive including a driving pulley and a driven pulley, means operatively connecting said driven pulley to said member for rotating said member to move said idler gears into and out of meshing engagement with said first and second gear means upon rotation of the driven pulley, electrically controllable means energizable for selectively driving said driving pulley, electro-magnetic brake means for selectively preventing rotation of said member, and switch means for controlling the energization of said electrically controllable means and said brake means and operable to release said brake means upon operation of said electrically controllable means for driving said driving pulley and to engage said brake means upon the deenergization of said electrically controllable means.

14. In a speed change transmission having a low speed, a high speed, and at least one intermediate speed, first and second spaced shafts, first gear means on one of said shafts, a plurality of different size gears on the other of said shafts including one for each of the speeds of the transmission, a plurality of first idler gears including one for each of the speeds of the transmission, each of said idler gears being adapted to mesh with both said first gear means and the corresponding gear on said second shaft for the particular speed when positioned therebetween, a member supporting said idler gears in spaced angular relationship on one side of said first shaft progressively in increasing order of the speeds provided thereby when proceeding in one direction about the shaft and rotatable to sequentially move said first idler gears to and through meshing engagement with their corresponding gears on said second shaft, and a second idler gear for each of the intermediate speeds of the transmission adapted to mesh with said first gear means and the gear on said second shaft corresponding to the particular speed when positioned directly between the latter and the first gear means, said member supporting each of said second idler gears in spaced angular relationship on the other side of said first shaft progressively in increasing order of the speeds provided thereby when proceeding about the shaft in a direction opposite to said first direction, power actuated drive means operable to selectively rotate the member, first brake means for preventing rotation of said member when said drive means is not operating to rotate the member, and second brake means for selectively preventing rotation of said first shaft.

15. In a machine tool having a movable element and drive means for moving the element, said drive means comprising a multiple speed transmission having a high speed, a low speed, and at least one intermediate speed, first and second spaced shafts, first and second non-meshing gear means on said first and second shafts respectively, a plurality of idler gears including at least one idler gear for each speed of the transmission, each of said idler gears being adapted to mesh with both said first and second gear means when positioned directly therebetween to interconnect said first and second shafts and provide a particular gear ratio to obtain a particular speed, a cage member supporting said idler gears about one of said shafts in spaced angular relationship to each other and rotatable in a given direction to sequentially move said idler gears into and through their respective meshing positions, power actuated means for selectively preventing rotation of said cage member and for selectively rotating said cage member, and servo-control means for positioning the cage member comprising a shaft rotated in timed relationship to the rotation of said cage member and having at least one angular position corresponding to each angular position of said cage member, a control member angularly positionable about said shaft and movable to a first position for operating said power actuated means to rotate said cage member and to a second position for operating said power actuated means to prevent rotation of said cage member, means continually urging said control member to said first position and means on said shaft for moving said member to said second position when said control member and said shaft are positioned in a predetermined angular relationship.

16. In a machine tool having a movable element and power actuated means for moving the element, said power actuated means comprising a multiple speed transmission having a high speed, a low speed, and at least one intermediate speed, first and second spaced shafts, first and second non-meshing gear means on said first and second shafts respectively, a plurality of idler gears including at least one idler gear for each speed of the transmission, each of said idler gears being adapted to mesh with both said first and second gear means when positioned directly therebetween to interconnect said first and second shafts and provide a particular gear ratio to obtain a particular speed, a cage member supporting said idler gears about one of said shafts in spaced angular relationship to each other and rotatable in a given direction to sequentially move said idler gears into and through their respective meshing positions, an electrically controllable brake for selectively preventing rotation of said cage member, electrically controllable drive means for selectively rotating said cage member, and servo-control means for positioning the cage member comprising a shaft rotated in timed relationship to the rotation of said cage member and having at least one angular position corresponding to each angular position of said cage member, a control member angularly positionable about said shaft and movable between first and second positions, means continually urging said control member to said first position, means on said shaft for moving said member to said second position when said control member and said shaft are positioned in a predetermined angular relationship, and circuit means for controlling said brake and said electrically controllable means including switch means adjacent to said control member and operated by movement of the control member to one of its positions to disengage said brake and cause operation of said drive means and operated by movement of the control member to its other position to engage said brake and stop the operation of said drive means.

References Cited in the file of this patent
UNITED STATES PATENTS 727,404   Mills _____ May 5, 1903